United States Patent [19]
Brinkmann et al.

[11] 3,994,765
[45] Nov. 30, 1976

[54] ENDLESS PRESSURE BELT FOR LAMINATING CHIPBOARD PANELS

[75] Inventors: Heinz Brinkmann, Bennigsen; Rolf Gersbeck, Hannover, both of Germany

[73] Assignee: Hermann Berstorff Maschinenbau GmbH, Hannover-Kleefeld, Germany

[22] Filed: Jan. 21, 1975

[21] Appl. No.: 542,781

Related U.S. Application Data

[63] Continuation of Ser. No. 343,254, March 21, 1973, abandoned.

[30] Foreign Application Priority Data
Mar. 29, 1972 Germany............................ 2215310

[52] U.S. Cl............................. 156/324; 74/237; 156/555
[51] Int. Cl.²...................... B32B 31/20; B31F 1/00
[58] Field of Search............................ 156/137–142, 156/209, 219, 238, 239, 289, 312, 324, 435–437, 459, 460, 543, 547, 549, 552, 555, 380, 500; 428/511–513; 74/231 R, 237, 239; 140/3 R, 3 C, 31; 245/2

[56] References Cited
UNITED STATES PATENTS

| | | | |
|---|---|---|---|
| 2,093,904 | 9/1937 | Bierer | 74/231 R |
| 2,114,517 | 4/1938 | Apel et al. | 74/237 |
| 2,485,725 | 10/1949 | Francis | 156/238 |
| 3,188,259 | 6/1965 | Leger | 156/380 |
| 3,307,993 | 3/1967 | Gottwald et al. | 156/324 |
| 3,825,462 | 7/1974 | Ettel | 156/289 |

Primary Examiner—William A. Powell
Assistant Examiner—John E. Kittle
Attorney, Agent, or Firm—Donald D. Jeffery

[57] ABSTRACT

An endless belt for use in a machine for laminating a continuous strip of chipboard panel to a decorative film by passing the chipboard and film between a heated revolving drum and the endless belt which is pressed against the drum, wherein the endless belt is formed as a web of flexible steel wire strands preferably including a layer of elastic material such as rubber.

5 Claims, 2 Drawing Figures

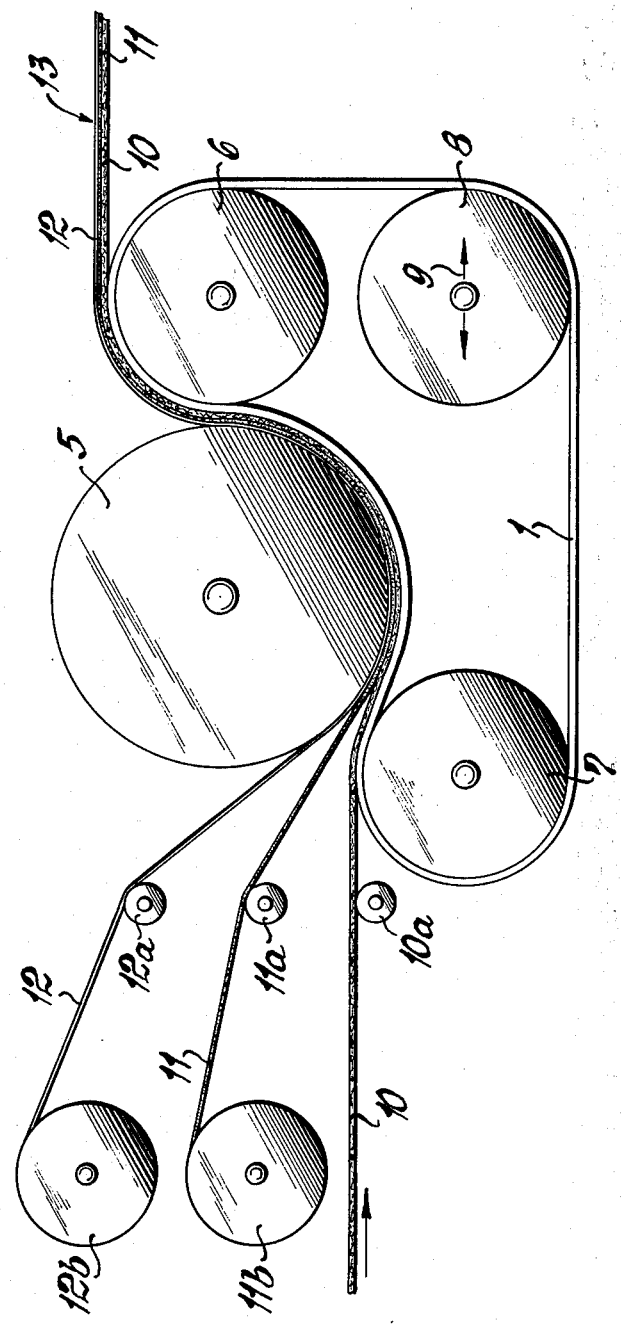

ENDLESS PRESSURE BELT FOR LAMINATING CHIPBOARD PANELS

This is a continuation of application Ser. No. 343,254, filed Mar. 21, 1973, now abandoned.

The invention relates to a machine for laminating a continuous strip of chipboard panel to a decorative film wherein the strip and film are passed between a heated drum and an endless belt looped around the heated drum and particularly to improvements in endless pressure belts for use in such a machine.

It has been previously proposed to laminate materials in such a machine using an endless solid steel belt.

Use of such endless solid steel belts has the disadvantage that slight deformations in the steel belt itself and/or variations in the thickness of the chipboard to be laminated, cause uneven pressure between the film to be laminated and the chipboard. In consequence the bond achieved between the film and the chipboard is defective or non-existent in some places and air, enclosed between the two layers of material in such places, is not pressed out when the material enters the nip between the heated drum and the endless belt.

While the material to be laminated is looped around the heated drum and pressed between the drum and the endless solid steel belt, the air which is enclosed at such places is heated and expands. Welding or adhesion, preferably utilising a bonding agent such as a film of polyethylene, of the decorative film to the strip of chipboard panel at such places is prevented because a solid steel belt cannot adapt itself to irregularities.

The life of a solid steel belt is also relatively short, since the frequent alternating bending creates tensions in the belt, giving rise to fatigue and consequent fracture.

According to the invention there is provided a machine for laminating a continuous strip of chipboard panel to a decorative film with or without adhesive, wherein material to be laminated is passed between a heated revolving drum and a tensioned endless belt looped round part of the heated drum, the improvement comprising forming the endless belt as a web of flexible steel wire strands.

When pressure is applied to the materials to be laminated, the web of flexible steel wire strands adapts itself to the thickness tolerances and irregularities in the material, thus generating a completely uniform pressure while looped around the heated drum and ensuring a good laminating action.

Preferably, the endless web of flexible steel wires is covered with an elastic layer which may comprise a continuous strip of vulcanised rubber joined to the web by a bonding agent. In use, the belt is preferably looped around at least one quarter of the periphery of the heated drum.

The particular advantage of using a rubber-coated web of flexible steel wire strands for laminating relatively non-elastic strips of chipboard is that such an endless pressure belt can adapt itself even to the slightest irregularities in either the strip of chipboard or the decorative film, so that excellent lamination is achieved between the chipboard strips and other materials.

The invention is diagrammatically illustrated by way of example in the accompanying drawing, in which:-

FIG. 1 is a side view of a machine for laminating a continuous strip of chipboard panel to a decorative film, and FIG. 2 is a cross-section through an endless belt according to the invention for the machine of FIG. 1.

Referring to the drawing, and firstly to FIG. 2, an endless belt 1 comprises a standard woven web formed by twisted warp wire strands 2 and weft wire strands 3 covered on one side with an elastic layer 4, preferably of rubber.

The continuous laminating machine shown in FIG. 1 has a heated drum 5, two direction-changing rolls 6 and 7 and a belt tensioning roll 8 which is displaceable in the directions of arrows 9. The endless belt 1, described with reference to FIG. 2, winds round the rolls 6, 7 and 8 and lies against the heated drum 5 for at least one quarter of the periphery of the heated drum 5.

In operation: chipboard in the form of a continuous strip 10 passes over a guide roller 10a into the gap between the belt 1, passing over the direction-changing roll 7, and the heated drum 5. A decorative film 12 from a reel 12b is fed over a guide roller 12a; both these films enter the gap between the heated drum 5 and the chipboard strip 10 which lies on the endless belt 1 passing over the direction-changing roll 7. While the chipboard strip 10, the adhesive 11 and the decorative film 12 to be laminated pass around the heated drum 5, the laminating action is completely uniform since the endless belt 1, formed as a web of flexible steel wire strands, adapts itself to any irregularities. A laminate 13, formed by the heat from the heated drum 5 and the pressure of the belt 1, from the chipboard strip 10, the adhesive 11 and the decorative film 12, issues over the roller 6 and is fed to another machine for further processing. The tension roll 8 is adjusted in position so that the material to be laminated is subjected to the desired pressure as it passes around the drum 5.

What is claimed is:

1. A continuous laminating machine for laminating a continuous strip of chipboard panel to a decorative film, comprising:
   a. a heated drum
   b. a pair of direction-changing rolls mounted adjacent said heated drum and space peripherally therearound,
   c. an adjustable tensioning roll
   d. an endless belt looped around part of said heated drum and said direction-changing and tensioning rolls, said belt comprising a standard woven web of flexible steel strands covered with an elastic layer, said flexible steel strands comprising continuous and relatively closely spaced warp wire strands and continuous, relatively closely spaced weft wire strands, and
   e. means for continuously feeding a strip of chipboard panel, an adhesive film and a separate strip of decorative film into the gap between said heated drum and said belt, said flexible steel wire strands belt adapting itself to thickness tolerances and irregularities in the strips of laminating materials thereby generating a completely uniform pressure on said strips while the same are looped around and in contact with said part of said heated drum, said adhesive film being heated by said drum and adhesively bonding said decorative strip to said strip of chipboard panel.

2. The machine of claim 1 wherein said adhesive film is polyethylene.

3. The machine of claim 1 wherein said elastic layer is vulcanized rubber which is bonded to said warp wire strands and said weft wire strands.

4. The method of continuously laminating a continuous strip of chipboard panel to a decorative film, comprising the steps of:
 a. feeding separate continuous strips of chipboard panel and decorative film together with a bonding agent to a gap between a heated drum and an endless belt, and
 b. adjusting the tension in said belt so as to bias said strips in pressure contact against said drum, said contact being of sufficient circumferential extent around said drum to laminate said strip of decorative film to said strip of chipboard panel, said pressure on said strip being completely uniform regardless of thickness tolerances and irregularities in the strips by virtue of said belt being comprised of a standard woven web of flexible steel strands including continuous and relatively closely spaced warp wire strands and continuous, relatively closely spaced weft wire strands, said strands being covered with an elastic layer.

5. The method of claim 4 wherein said bonding agent comprises a separate strip of adhesive film.

* * * * *